United States Patent
Kaiserlian et al.

(10) Patent No.: US 9,607,078 B1
(45) Date of Patent: Mar. 28, 2017

(54) PRESENTING RELATED COMMUNICATIONS

(75) Inventors: Christian Kaiserlian, New York, NY (US); Adam Berenzweig, Brooklyn, NY (US); Lorenz Huelsbergen, Lebanon, NJ (US)

(73) Assignee: Google Inc., Mountain View, CA (US)

( * ) Notice: Subject to any disclaimer, the term of this patent is extended or adjusted under 35 U.S.C. 154(b) by 1185 days.

(21) Appl. No.: 13/613,461

(22) Filed: Sep. 13, 2012

Related U.S. Application Data (63) Continuation of application No. 13/479,465, filed on May 24, 2012, now Pat. No. 8,332,477.

(60) Provisional application No. 61/527,228, filed on Aug. 25, 2011.

(51) Int. Cl.
G06F 17/30 (2006.01)

(52) U.S. Cl.
CPC ............................. *G06F 17/30696* (2013.01)

(58) Field of Classification Search
CPC ................................................ G06F 17/30696
USPC ........................................................ 709/206
See application file for complete search history.

(56) References Cited

U.S. PATENT DOCUMENTS

| | | | |
|---|---|---|---|
| 6,484,196 B1* | 11/2002 | Maurille | 709/206 |
| 6,683,632 B2* | 1/2004 | Newman | 715/853 |
| 7,007,226 B1 | 2/2006 | Smith et al. | |
| 7,039,677 B2* | 5/2006 | Fitzpatrick et al. | 709/204 |
| 7,143,054 B2* | 11/2006 | Doherty | 705/7.33 |
| 7,328,242 B1* | 2/2008 | McCarthy et al. | 709/204 |
| 7,506,263 B1 | 3/2009 | Johnston et al. | |
| 7,516,186 B1* | 4/2009 | Borghetti et al. | 709/206 |
| 7,689,655 B2 | 3/2010 | Hewitt et al. | |
| 7,693,951 B2 | 4/2010 | Gusler et al. | |
| 7,702,315 B2 | 4/2010 | Engstrom et al. | |
| 7,716,593 B2* | 5/2010 | Durazo et al. | 715/752 |
| 7,725,538 B2 | 5/2010 | Kirkland et al. | |
| 7,769,144 B2 | 8/2010 | Yao et al. | |
| 7,814,159 B2 | 10/2010 | Sego et al. | |
| 7,865,560 B2 | 1/2011 | Rohall et al. | |
| 7,870,204 B2 | 1/2011 | LeVasseur et al. | |
| 7,904,515 B2* | 3/2011 | Ambati et al. | 709/205 |
| 7,962,555 B2* | 6/2011 | Sastry et al. | 709/206 |
| 8,001,126 B2 | 8/2011 | Berry et al. | |

(Continued)

OTHER PUBLICATIONS

Thomas Erickson et al., "Social Translucence: Using Minimalist Visualizations of Social Activity to Support Collective Interaction," Designing Information Spaces: The Social Navigation Approach (eds. K. Höök, D. Benyon, A Munroe), Springer-Verlag: London, 2003, pp. 17-41.

(Continued)

*Primary Examiner* — Douglas Blair
(74) *Attorney, Agent, or Firm* — Fish & Richardson P.C.

(57) ABSTRACT

Methods, systems, and apparatus, including computer programs encoded on a computer storage medium, for presenting related conversations. In one aspect, it is determined that a portion of a conversation thread includes an exchange of messages between fewer than a predetermined number of conversation participants. Based on determining that the portion of the conversation thread includes the exchange of messages between fewer than the predetermined number of conversation participants, a conversation view can be generated that that includes a flattened representation of the portion of the conversation thread.

12 Claims, 6 Drawing Sheets

(56) References Cited

U.S. PATENT DOCUMENTS

| | | | |
|---|---|---|---|
| 8,046,014 B2* | 10/2011 | Donald et al. | 455/466 |
| 8,055,715 B2* | 11/2011 | Bensky et al. | 709/206 |
| 8,126,975 B2* | 2/2012 | Hoyne et al. | 709/206 |
| 8,180,841 B2* | 5/2012 | Hardy et al. | 709/207 |
| 9,262,455 B2* | 2/2016 | Palay | G06F 17/30312 |
| 2003/0163537 A1 | 8/2003 | Rohall et al. | |
| 2004/0044735 A1* | 3/2004 | Hoblit | G06Q 10/107 709/206 |
| 2004/0145608 A1* | 7/2004 | Fay et al. | 345/758 |
| 2004/0199590 A1* | 10/2004 | Keohane et al. | 709/206 |
| 2005/0004990 A1* | 1/2005 | Durazo et al. | 709/206 |
| 2005/0149620 A1 | 7/2005 | Kirkland et al. | |
| 2005/0149621 A1 | 7/2005 | Kirkland et al. | |
| 2005/0204009 A1* | 9/2005 | Hazarika et al. | 709/206 |
| 2006/0168025 A1* | 7/2006 | Jain | 709/206 |
| 2006/0271630 A1* | 11/2006 | Bensky et al. | 709/206 |
| 2007/0033250 A1 | 2/2007 | Levin et al. | |
| 2007/0250576 A1 | 10/2007 | Kumar et al. | |
| 2007/0282956 A1 | 12/2007 | Staats | |
| 2008/0082607 A1* | 4/2008 | Sastry et al. | 709/204 |
| 2008/0104173 A1 | 5/2008 | Wilcox et al. | |
| 2008/0140782 A1* | 6/2008 | Bagwell et al. | 709/206 |
| 2009/0031232 A1 | 1/2009 | Brezina et al. | |
| 2009/0070294 A1 | 3/2009 | Chijiiwa | |
| 2010/0162132 A1 | 6/2010 | Vankamamidi et al. | |
| 2010/0211889 A1* | 8/2010 | Durazo et al. | 715/752 |
| 2010/0229127 A1 | 9/2010 | Williams | |
| 2010/0250683 A1* | 9/2010 | Hoyne et al. | 709/206 |
| 2011/0126126 A1* | 5/2011 | Blair | 715/752 |
| 2012/0036197 A1* | 2/2012 | Bishop | 709/206 |
| 2012/0124147 A1* | 5/2012 | Hamlin et al. | 709/206 |
| 2012/0124483 A1* | 5/2012 | Zuckerberg et al. | 715/752 |
| 2012/0124486 A1 | 5/2012 | Robinson et al. | |
| 2012/0143972 A1* | 6/2012 | Malik et al. | 709/206 |
| 2012/0200567 A1* | 8/2012 | Mandel et al. | 345/420 |

OTHER PUBLICATIONS

Andrew Leonard, "You are who you know," Salon Media Group, Inc., Jun. 15, 2004, 15 pages.

Ralph Gross et al., "Information Revelation and Privacy in Online Social Networks," Proceeding of the 2005 ACM Workshop on Privacy in the Electronic Society (WPES'05), Nov. 7, 2005, pp. 71-80.

Junichiro Mori et al., "Real-world Oriented Information Sharing Using Social Networks," Proceedings of the 2005 International ACM SIGGROUP Conference on Supporting Group Work (GROUP 05), Nov. 6-9, 2005, pp. 81-84.

Alice Emily Marwick, "Selling Your Self: Online Identity in the Age of a Commodified Internet," Thesis for degree of Master of Arts, University of Washington, 2005, 192 pages.

Jeffrey Heer et al., "Vizster: Visualizing Online Social Networks," IEEE Symposium on Information Visualization (INFOVIS 2005), Oct. 23-25, 2005, pp. 32-39.

Newman, Paula S., "Treetables and Other Visualizations for Email Threads," Xeroz PARC (2001), 8 pages.

Sullivan, Danny, "Google Realtime Search Gets Home Page Conversation View, Alerts & Geosearch," 11 pages. http://searchengineland.com/google-realtime-search-49393 (Aug. 26, 2010).

Blair, Douglas B., Notice of Allowance issued in U.S. Appl. No. 13/479,465 on Aug. 13, 2012, 16 pages.

* cited by examiner

PRESENTING RELATED COMMUNICATIONS

CROSS-REFERENCE TO RELATED APPLICATIONS

This application is a continuation of U.S. patent application Ser. No. 13/479,465, filed on May 24, 2012, which claims priority to U.S. Provisional Application No. 61/527,228, filed on Aug. 25, 2011. The entire contents of U.S. patent application Ser. No. 13/479,465 and U.S. Provisional Application No. 61/527,228 are incorporated herein by reference.

BACKGROUND

This specification relates to presenting related communications.

Electronic communications can take many forms, including, for example, e-mail messages, short message service (SMS) text messages, microblogs, social media status updates, Internet forum posts, and comments on blogs and web pages. Communications can be related, for example, through reply relationships.

SUMMARY

The presentation of messages in a conversation thread can be based on various properties of the messages. For example, when a portion of a conversation thread includes an exchange between a few conversation participants, a conversation view for the conversation thread can include a flattened representation of that portion. As another example, in response to receiving data identifying a search result selected by a user, the conversation view can be generated to visually distinguish a message that corresponds to the user-selected search result. As another example, in response to determining that a portion of the conversation thread includes messages that have respective indent levels that meet or exceed a predetermined maximum indent level value, the conversation view can be generated that omits the messages that have respective indent levels that meet or exceed the predetermined maximum indent level value.

One innovative aspect of the subject matter described in this specification is embodied in methods that include the actions of: identifying a conversation thread from a plurality of messages; determining a number of participants associated with a portion of the conversation thread that includes a sequence of messages; comparing the number of participants to a threshold value; and generating a representation of the portion of the conversation thread based on comparing the number of participants to the threshold value, the representation having formatting different from formatting of representations of other portions of the conversation thread.

These and other embodiments may each optionally include one or more of the following features. For instance, determining the number of participants associated with the portion of the conversation thread includes determining the number of participants that submitted at least one message that is included in the portion. Identifying the conversation thread from a plurality of messages includes identifying a plurality of messages that correspond to the conversation thread and that are related by a reply relationship or a topical relationship. Generating the representation of the portion of the conversation thread based on comparing the number of participants to the threshold value includes flattening a representation of the portion based on comparing the number of participants to the threshold value. Generating the representation of a portion of the conversation thread based on comparing the number of participants to the threshold value includes applying formatting parameters for the portion of the conversation thread that are different from formatting parameters applied for other portions of the conversation thread surrounding the portion of the conversation thread in the conversation view. Generating the representation of the portion of the conversation thread based on comparing the number of participants to the threshold value includes generating the representation such that messages of the portion of the conversation thread have the same indent level. Generating the representation of a portion of the conversation thread based on comparing the number of participants to the threshold value includes modifying the representation to align messages of the portion to a common vertical reference position, the representation being included in a conversation view that includes a representation of a second portion of the conversation thread, the messages of the second portion being offset from the vertical reference position.

Comparing the number of participants to a threshold value includes determining that the portion includes only messages by either of two participants. Generating the representation of the portion of the conversation thread based on comparing the number of participants to the threshold value includes, in response to determining that the portion includes only messages by either of two participants, generating the representation such that the representation presents each of the messages of the portion at a first indent level. Generating a conversation view that includes a second representation of a second portion of the conversation thread located adjacent to the representation, the second representation presenting second messages of the conversation thread at indent levels different from the first indent level.

Another innovative aspect of the subject matter described in this specification is embodied in methods that include the actions of: obtaining data for a conversation thread; determining that a portion of the conversation thread includes an exchange of messages between fewer than a predetermined number of conversation participants; and based on determining that the portion of the conversation thread includes the exchange of messages between fewer than the predetermined number of conversation participants, generating a conversation view that includes a flattened representation of the portion of the conversation thread.

These and other embodiments may each optionally include one or more of the following features. For instance, generating the conversation view that includes the flattened representation of the portion of the conversation thread includes applying formatting parameters for the portion of the conversation thread that are different from formatting parameters applied for messages surrounding the portion of the conversation thread in the conversation view. Generating the conversation view that includes the flattened representation of the portion of the conversation thread includes generating the conversation view such that messages of the portion of the conversation thread have the same indent level. Generating the conversation view that includes the flattened representation of the portion of the conversation thread includes generating the conversation view such that messages of the portion of the conversation thread are aligned in a column. Determining that the portion of the conversation thread includes an exchange of messages between fewer than a predetermined number of conversation participants includes determining that the exchange of messages includes a sequence of messages submitted by two conversation participants in an alternating order. Generating the conversation view that includes the flattened representation of the portion of the conversation thread includes generating the flattened representation in response to determining that the exchange of messages includes the sequence of messages submitted by the two conversation participants in the alternating order. Generating the conversation view that includes the flattened representation of the portion of the conversation thread includes: generating the flattened representation such that messages of the exchange of messages have a common indent level regardless of respective reply depths of the messages of the portion; generating a representation of a second portion of the conversation thread that includes second messages, the second messages having indent levels in the second representation that correspond to the respective reply depths of the second messages; and generating the conversation view to include the representation of the second portion located adjacent to the flattened representation.

Another innovative aspect of the subject matter described in this specification is embodied in methods that include the actions of: determining that a portion of a conversation thread includes an exchange of messages between fewer than a predetermined number of conversation participants; and based on determining that the portion of the conversation thread includes the exchange of messages between fewer than the predetermined number of conversation participants, generating a conversation view that that includes a flattened representation of the portion of the conversation thread.

These and other embodiments may each optionally include one or more of the following features. For instance, generating the conversation view that that includes the flattened representation of the portion of the conversation thread includes applying formatting parameters for the portion of the conversation thread that are different from formatting parameters applied for messages surrounding the portion of the conversation thread in the conversation view. Generating the conversation view that that includes the flattened representation of the portion of the conversation thread includes generating the conversation view such that messages of the portion of the conversation thread have the same indent level. Generating the conversation view that that includes the flattened representation of the portion of the conversation thread includes generating the conversation view such that messages of the portion of the conversation thread are aligned in a column.

Another innovative aspect of the subject matter described in this specification is embodied in methods that include the actions of: identifying a conversation thread from a plurality of messages; determining a number of participants to a portion of the conversation thread; comparing the number of participants to a threshold value; and modifying a representation of the portion of the conversation thread based on comparing the number of participants to the threshold value. Other embodiments of this aspect include corresponding systems, apparatus, and computer programs, configured to perform the actions of the methods, encoded on computer storage devices.

These and other embodiments may each optionally include one or more of the following features. For instance, determining the number of participants to the portion of the conversation thread includes determining the number of participants that submitted at least one message that is included in the portion. Identifying the conversation thread from a plurality of messages includes identifying a plurality of messages that correspond to the conversation thread and that are related by a reply relationship or a topical relationship. Modifying a representation of a portion of the conversation thread based comparing the number of participants to the threshold value includes flattening a representation of the portion based on comparing the number of participants to the threshold value.

Another innovative aspect of the subject matter described in this specification is embodied in methods that include the actions of: receiving data identifying a search result selected by a user; and in response to receiving the data, generating a conversation view that presents a message that corresponds to the user-selected search result, and that visually distinguishes the message from other messages that are presented in the conversation view. Other embodiments of this aspect include corresponding systems, apparatus, and computer programs, configured to perform the actions of the methods, encoded on computer storage devices.

These and other embodiments may each optionally include one or more of the following features. For instance, generating the conversation view that presents a message that corresponds to the user-selected search result, and that visually distinguishes the message from other messages that are presented in the conversation view includes generating the conversation view such that the message that corresponds to the user-selected search result is highlighted. Generating a conversation view that presents a message that corresponds to the user-selected search result, and that visually distinguishes the message from other messages that are presented in the conversation view includes: identifying, in a plurality of pages that represent a conversation thread, a page that presents the message that corresponds to the user-selected search result; and generating the conversation view to present the identified page. Generating a conversation view that presents a message that corresponds to the user-selected search result, and that visually distinguishes the message from other messages that are presented in the conversation view includes generating the conversation view to scroll to a position at which the message that corresponds to the user-selected search result is visible.

Another innovative aspect of the subject matter described in this specification is embodied in methods that include the actions of: determining that a portion of a conversation thread includes messages that have respective indent levels that meet or exceed a predetermined indent level value; and in response to determining that the portion of the conversation thread includes messages that have respective indent levels that meet or exceed a predetermined indent level value, generating a conversation view that includes one or more messages that precede or succeed the portion in the conversation thread, and that omits the messages that have respective indent levels that meet or exceed the predetermined indent level value. Other embodiments of this aspect include corresponding systems, apparatus, and computer programs, configured to perform the actions of the methods, encoded on computer storage devices.

These and other embodiments may each optionally include one or more of the following features. For instance, generating the conversation view that includes one or more messages that precede or succeed the portion in the conversation thread, and that omits the messages that have respective indent levels that meet or exceed the predetermined indent level value includes generating the conversation view to display a visual indicator in place of the portion of the conversation view. The visual indicator is a user-selectable control for presenting the omitted messages that meet or exceed the predetermined indent level value.

Other embodiments of these aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

Advantageous implementations can include one or more of the following features. Visual representations of related communications can be presented in a visually appealing manner. Related communications can be presented in a manner that indicates the context of the communications in a larger set of communications. A message corresponding to a search result selected by a user can be distinguished from other related messages, allowing a user to find relevant information more quickly. Messages in an exchange between a subset of the participants in a conversation can be formatted based on the number of participants in the exchange, to reflect the existence of a sub-conversation.

The details of one or more embodiments are set forth in the accompanying drawings and the description below. Other features and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
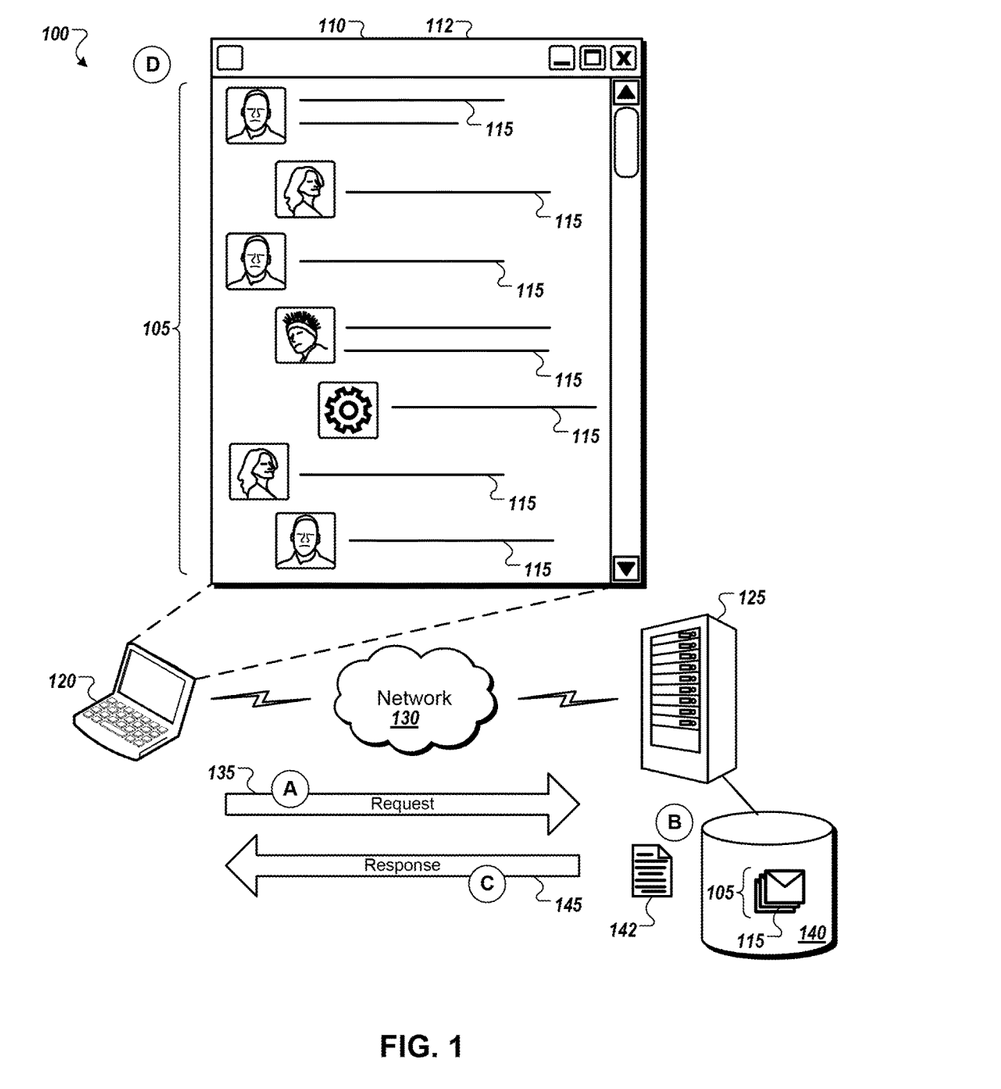
FIG. 1 is a schematic diagram that illustrates an example of a system for presenting related communications.

FIG. 1 is a schematic diagram that illustrates an example of a system for presenting related communications. The system 100 includes a computing device 120 and a server system 125, which communicate over a network 130. The diagram shows states (A) to (D), which may occur in the sequence illustrated or in a different sequence. States (A) to (C) illustrate a flow of data, and state (D) illustrates the presentation of a user interface 110.

The computing device 120 can be, for example, a desktop computer, laptop computer, a tablet computer, a cellular phone, a smart phone, a music player, an e-book reader, a navigation system, or any other appropriate type of processing device. The operations performed by the server system 125 can be performed by individual computer systems or can be distributed across multiple computer systems. The network 130 can be wired or wireless or a combination of both. The network 130 can include one or more public or private networks, and can include the Internet.

Various communication modes can produce conversation threads that include multiple related messages. Electronic media, for example, social networks, blogs, discussion groups, and newsgroups, can produce conversation threads that are lengthy and complex. A conversation thread may include messages submitted by many different participants (e.g., contributors), who may submit messages at different times and in reply to different messages in the conversation thread. As an example, after a heavily-followed author (e.g., a celebrity or politician) submits a message, hundreds or even thousands of people may respond to the author's message or to responses of other participants, generating a conversation thread that is large and complex.

Messages in a conversation thread can be related through one or more relationships. Reply relationships, for example, can include direct replies and indirect replies (e.g., a reply message that is separated from a replied-to message one or more intermediate reply messages in a series of replies). Messages can also be topically related. For example, within a given conversation thread, different portions of the conversation may discuss different topics or sub-topics. As an example, initial participants to a conversation may discuss a first topic, and later participants may discuss a second topic, or a variation of the first topic. Topical relationships can be determined based on, for example, commonalities in the subject matter of the messages, such as commonalities in headers or subject fields of the messages.

Conversation views can be generated that visually present a conversation thread in a manner that is understandable to and organized for easy consumption by a user. In the conversation view, excessive complexity can be avoided by presenting a selected subset of the messages in the conversation thread. Messages in the conversation thread can be formatted to indicate the relationships between messages that are presented and messages that are not presented. The relationships indicated can be, for example, direct replies, indirect replies, replies to particular participants or groups of participants, and topical relationships. As another example, the number of participants to which a message is directed can be indicated (e.g., a reply to multiple participants such as a "reply to all" message may be distinguished from a reply to a single participant).

The techniques described herein can be used to present many types of conversations. For example, the techniques can be used when a conversation thread to be presented has a large number of messages and/or a large number of conversation participants, for example, more than five, ten, fifty, one hundred, five hundred, one thousand, or several thousand messages and/or conversation participants. The techniques can also be used to present conversations that have, for example, five or fewer messages and/or conversation participants.

For example, the conversation view can indicate the relationship between presented messages and the conversation thread as a whole. The conversation view can be formatted and paginated to indicate, for example, the nature of the conversation thread, the relationship of a conversation thread and a selected search result, and various relationships between presented messages.

In state (A), the computing device 120 sends a request 135 to the server system 125. The request 135 can be a request for a resource (e.g., a web page) that provides a representation of a conversation thread. The request 135 can include information that identifies a particular conversation thread 105, for example, by identifying a message 115 that is part of the conversation thread. In some implementations, the request 135 can result from selecting a link on search results page, where the link is associated with one of the messages 115 in the conversation thread 105.

The conversation thread 105 indicated by the request 135 includes multiple messages 115. The messages 115 can include one or more of, for example, e-mail messages, short message service (SMS) text messages, microblogs, social media status updates, Internet forum posts, blog posts, comments on blogs and web pages, and other electronic media messages. The messages 115 can include, for example, text, images, audio, video, and other content.

In state (B), in response to receiving the request 135, the server system 125 generates a conversation view 112 for the conversation thread 105 identified by the request 135. To generate the conversation view 112, the server system 125 can generate data for presenting a visual representation of the conversation thread 105. For example, the server system 125 can generate a resource 142, such as a hypertext markup language (HTML) file, that causes the conversation view 112 to be displayed when rendered. For example, the conversation view 112 can be provided to computing device 120 for rendering and displaying.

The server system 125 can identify a conversation thread 105 indicated by the request 135 by accessing a data repository 140. In some implementations, the data repository 140 can be a database or other appropriate data store of messages. The data repository 140 can store the content of the messages 115, which may be accessed from other server systems or received directly from users. In addition, or as an alternative, the data repository 140 can store an index that describes one or more aspects of the messages 115 and the conversation thread 105.

The server system 125 identifies each message 115 in the conversation thread 105, and identifies relationships among the messages 115. For example, the server system 125 can determine which of the messages 115 are replies to which other messages 115, and can determine the sequence in time in which the messages 115 were submitted. In some implementations, the server system 125 identifies messages in the conversation thread 105 at the time the request 135 is received, permitting the server system 125 to generate a conversation view that indicates the current state of the conversation thread 105, which may change in real-time as new messages 115 are submitted.

The server system 125 may optionally generate a model for the conversation thread 105, for example, a tree having multiple nodes, where each node represents one of the messages 115 of the conversation thread 105. The root node of the tree can represent an initial message 115 that begins the conversation thread 105, and connections between the nodes can indicate reply relationships between the various messages 115. For example, a parent node can represent a first message, and a child node can represent a second message that is a direct reply to the first message. Sibling nodes can thus represent replies to the same message.

As described further below, generating the conversation view can include selecting or assigning formatting rules or other parameters for formatting the messages 115 of the conversation thread 105. The conversation view 112 can be generated to include enhancements that present the conversation thread 105 in a logical manner or in a simplified form. For example, the conversation view 112 can indicate the logical relationships between the messages 115 and provide context that indicates the relationships of the messages 115 to the conversation thread 105 as a whole. As another example, the conversation view 112 may omit one or more messages 115 to reduce the complexity of a representation of the conversation thread 105.

In state (C), the server system 125 transmits a response 145 to the computing device 120. The response 145 can include, for example, the resource 142 that includes the conversation view 112.

In state (D), the computing device 120 displays the conversation view on the user interface 110. For example, the computing device 120 renders the resource 142 received in the response 145, which causes the conversation view 112 to be rendered.

In some implementations, the computing device 120 generates the conversation view 112 rather than the server system 125, or generates the conversation view 112 in conjunction with the server system 125. For example, the computing device 120 may access information about the conversation thread 105 from, for example, a remote source such as the server system 125, from data stored locally at the computing device 120, or another source. The computing device 120 can generate and display the conversation view 112. The conversation view 112 may be generated using formatting rules of the computing device 120.

Figure 2A:
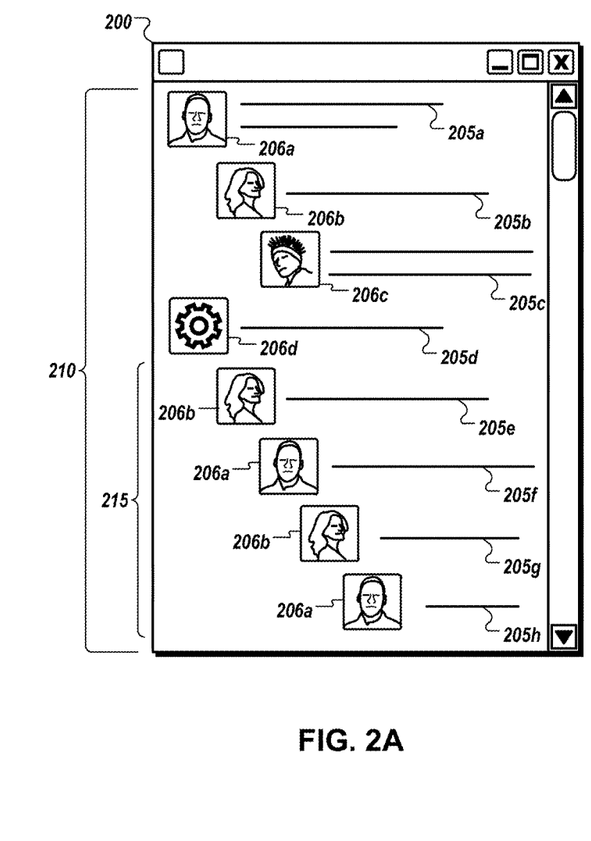
FIGS. 2A, 2B, 2C, 2D, 3, 4A, 4B, and 4C are diagrams that illustrate examples of enhanced conversation views.

FIG. 2A is a diagram that illustrates an example of an enhanced conversation view 200. The conversation view 200 includes messages 205a-205h, for example, text segments, that form part of a conversation thread 210. An identifier 206a-206d is displayed with each message 205a-205h. The identifiers 206a-206d identify the participant to the conversation that submitted the respective message 205a-205h. The identifiers 206a-206d can be, for example, icons, images, usernames, or other content.

The conversation view 200 displays the messages 205a-205h at various indent levels. The indent levels indicate reply relationships among the messages 205a-205h, and therefore indicate the structure of the conversation thread 210. The conversation view 200 is formatted such that messages that are replies to a first message are displayed below the first message and at an additional indent level relative to the first message. In other words, responses are indented one level deeper than the indent level of the message to which they respond.

Each indent level corresponds to a horizontal position, for example, an amount of space between a message and a vertical reference. In the illustrated example, the larger the indent level (e.g., level one, level two, or level three) of a message 205a-205h, the farther to the right the message 205a-205h is displayed. The indent levels can represent discrete spacing increments from, for example, the left side of a display area. The spacing increments between each indent level can be, but need not be, of uniform size.

As an example, the message 205a is displayed at an indent level of two. The message 205b, which is a reply to the message 205a, is displayed at an indent level of three, and is therefore indented one spacing increment to the right of the position of the message 205a. The message 205c is a reply to the message 205b, and is therefore displayed at an indent level of four.

As another example, the message 205a and the message 205d have the same indent level, representing that the messages 205a, 205d are replies to the same message. Portions of the conversation thread 210 that are not linked by reply relationships can be ordered by the respective times in which the messages are submitted. For example, the message 205a and replies to the message 205a can be displayed above the message 205d and replies to the message 205d to indicate that, for example, the message 205a was submitted before the message 205d.

In the conversation view 200, each of the messages 205a-205h is formatted according to the same formatting rules. As a result, a series of messages in which each message is a reply to the previous message in the series (e.g., the messages 205a-205c, or the messages 205d-205h) results in each message in the series being indented farther to the right than the message displayed above. This produces an angled or diagonal slope along left-hand side of the messages, with the messages displayed at progressively rightward positions.

Indent levels can additionally or alternatively represent spacing from a right side of a screen area. For example, messages may be displayed at varying spacing increments to the left of a vertical reference, such as the right side of a display area. In some implementations, the direction of indentation can be selected based on the display language of the messages. On a user interface displayed in a language that is read from left to right, messages can be indented rightward from a left side of a display area, as illustrated in FIG. 2A. By contrast, on a user interface displayed in a language that is read from right to left, messages can be indented leftward from a right side of a display area.

Figure 2B:
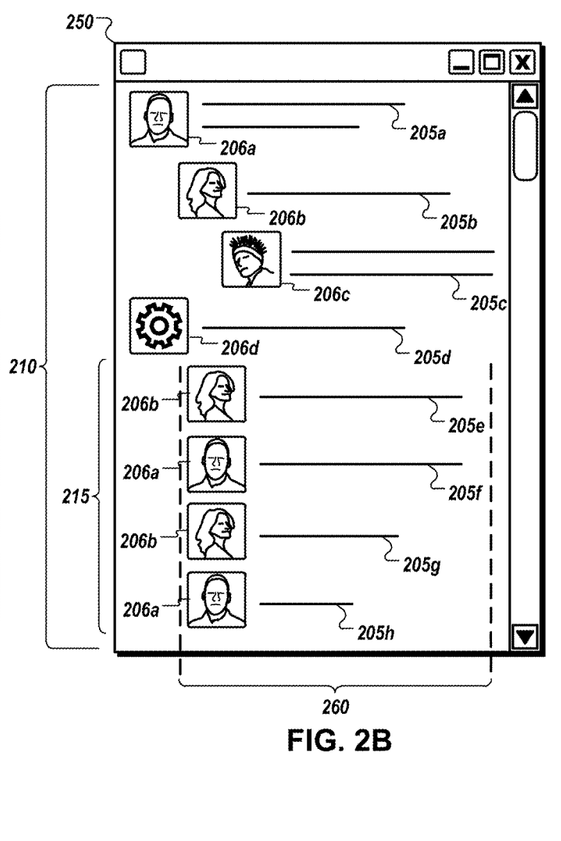

FIG. 2B is a diagram that illustrates an example of an enhanced conversation view 250. The conversation view 250 displays the messages 205a-205h of the conversation thread 210. By contrast with the conversation view 200, which formats the messages 205e-205h with different indent levels, the conversation view 250 formats each of the messages 205e-205h to have the same indent level.

In some instances, an exchange between a few participants may cause messages to become so deeply indented that viewing the messages becomes difficult. For example, some messages may be indented far to one side of a display area, or the user may be required to scroll horizontally in order to follow the exchange.

A portion 215 that includes an exchange among fewer than a predetermined threshold number of participants can be formatted in a different manner than other portions of the conversation thread 210. For example, the portion 215 includes an exchange of messages 205e-205h between two different conversation participants, represented by the identifiers 206a, 206b, respectively.

The messages 205e-205h in the portion 215 form a back-and-forth exchange, for example, a sequence of replies in which authorship alternates between the two participants. The message 205e is submitted by the first participant, and the message 205f is submitted by the second participant as a reply to the message 205e. The message 205g is submitted by the first participant as a reply to the message 205f, and so on. The portion 215 is a sub-conversation, or a private exchange, that occurs within the broader, overall conversation thread 210, which includes messages submitted by other participants.

In the conversation view 250, the formatting for the portion 215 is different from the formatting of the rest of the conversation thread 210. In the illustrated example, the display of the portion 215 is flattened or compressed, permitting a user to easily follow the exchange. For example, the series of messages 205e-205h that would otherwise be continuously indented is instead formatted to have a consistent indent level. The messages 205e-205h are vertically aligned (e.g., arranged in a column).

As an alternative, the portion 215 may be flattened such that indent levels for the messages 205e-205h in the portion 215 are different, but the differences in indent levels are smaller than for surrounding portions of the conversation. For example, the conversation view 250 can increase the indent level by one unit for each for each increase in reply depth (e.g., indent levels one, two, and three). By contrast, for the portion 215, the indent level can be increased by a half a unit for each increase in reply depth (e.g., indent levels one, one and a half, and two).

To generate the conversation view 250, a computing system (e.g., the server system 125 of FIG. 1) can determine that the portion 215 of the conversation thread 210 includes an exchange of messages between fewer than a predetermined number of conversation participants (e.g., fewer than a hundred participants, fewer than five participants, or fewer than three participants). In response on this determination, the computing system can generate a conversation view that includes a flattened representation of the portion 215 of the conversation thread 210. In general, a flattened representation can be generated for portion of a conversation thread can includes multiple messages, for example, a sequence of messages. The messages in the sequence can be submitted by multiple conversation participants.

A flattened representation can be generated for a portion of a conversation thread that includes more than two participants. For example, a threshold number of conversation participants can be ten. A flattened representation can be generated for a portion of a conversation that includes an exchange among fewer than ten conversation participants. Thus a portion of the conversation thread that includes an exchange among, for example, nine conversation participants can be represented with a flattened representation.

To generate the flattened representation, the computing system can apply formatting parameters to the portion 215 that are different from formatting parameters applied for messages surrounding the portion 215 in the conversation view 250. For example, the conversation view 250 can be generated such that the messages 205e-205h in the portion 215 of the conversation thread 210 are assigned the same indent level. The conversation view 250 can be generated such that the messages 205 of the portion 215 are aligned in a column 260.

In some implementations, the computing system determines whether to generate a flattened representation for the portion 215 of the conversation thread 210 based on whether the portion 215 satisfies multiple criteria. One criterion can be, as described above, whether fewer than a predetermined number of participants have contributed at least one message to the portion 215. Another criterion can be, for example, whether the portion 215 includes more than a predetermined number of messages, for example, whether the portion 215 includes more than three messages. The computing system may generate a flattened representation of the portion 215 when the number of messages in the portion 215 exceeds the predetermined number of messages and when the number of participants contributing at least one message to the portion is fewer than the predetermined number of participants. When either of the criteria is not satisfied, standard formatting can be applied to generate a standard or expanded representation.

The criteria can include, for example, whether the portion 215 includes messages contributed by a particular number of conversation participants. For example, the flattened representation can be generated for the portion 215 when, for example, it is determined that the portion 215 includes messages contributed by exactly two conversation participants.

The criteria can include, for example, whether the portion 215 includes a series of direct replies (e.g., an unbroken chain of replies). For example, the flattened representation can be generated for the portion 215 when it is determined that any message in the portion 215 is linked to any other message in the portion 215 through one or more reply relationships.

The criteria can include, for example, whether the portion 215 includes a sequence of alternating replies, or whether the portion 215 includes only a sequence of alternating replies. For example, a flattened representation can be generated for the portion 215 when it is determined that the portion 215 includes a back-and-forth exchange in which messages alternate between a first participant and a second participant, with each participant replying to the previous message by the other participant. Alternating replies can also occur in an exchange among more than two participants. For example, an exchange can alternate among more than two participants when, for each reply message in the exchange, the participant that submits each reply is different from the participant that submits the message being directly replied to. Thus the computing system can determine that an exchange of messages includes a sequence of messages submitted by two conversation participants in an alternating order, and the computer system can generate the flattened representation in response to determining that the exchange of messages includes the sequence of messages submitted by the two conversation participants in the alternating order.

In some implementations, the criteria include whether the conversation thread 210 includes a message that is a reply to any message in the portion 215 by a conversation participant that is not a participant in the exchange represented by the portion 215. For example, the portion 215 can include an exchange among a set of conversation participants. A flattened representation can be generated for the portion 215 when it is determined that the conversation thread 210 does not include any message in reply to the messages of the portion 215 except by participants in the set. If the conversation thread 210 includes, in reply to one or more messages of the portion 215, a message by a conversation participant that is not in the set, then the conversation view 250 can be formatted portion 215 can be formatted according to standard processing to more easily accommodate visualization of the reply messages by participants outside the set.

In some implementations, the computer system generates the flattened representation for the portion 215 such that messages of an exchange of messages (e.g., the messages 205e-205h) have a common indent level regardless of respective reply depths of the messages of the portion. The computer system also generates a representation of a second portion of the conversation thread that includes second messages (e.g., the messages 205a-205d) such that the second messages have indent levels in the second representation that correspond to the respective reply depths of the second messages. The computer system generates the conversation view to include the representation of the second portion located adjacent to the flattened representation.

To identify the portion 215, the computing system can access a tree or other hierarchical model for the conversation thread 210. For example, a tree that represents the conversation thread 210 can be accessed. A portion of the conversation thread 210 that includes an exchange between fewer than a predetermined number of conversation participants can be determined by examining sub-trees or branches of the tree. The number of unique conversation participants that contributed at least one message to the messages represented by the sub-tree can be counted. If the count is less than the predetermined number, then a flattened representation of the portion of the conversation thread 210 that corresponds to the sub-tree can be generated.

In some implementations, a conversation thread is identified from a plurality of messages. For example, a set of messages related by reply relationships or topical relationships can be identified and designated as a conversation thread.

A number of participants associated with a portion of the conversation thread is determined. A participant can be associated with the portion when at least one message submitted by the participant is included in the portion. The portion of the conversation thread can include a sequence of messages, for example, multiple messages that form a proper subset of the messages in the conversation thread. The messages of the sequence can be submitted by different participants. The messages of portion can be related by direct reply relationships, temporal sequence, topical relationships, and/or other relationships such that the portion is a contiguous section or region of the conversation thread.

The number of participants is compared to a threshold value. A representation of the portion of the conversation thread is generated based on comparing the number of participants to the threshold value. The generated representation can have formatting different from formatting of representations of other portions of the conversation thread. For example, representations that surround the generated representation, including representations immediately above and/or below the generated representation, can have different formatting from the generated representation. In some implementations, the generated representation forms a contiguous section of the conversation view for the conversation thread, and is uninterrupted by representations of messages that are not included in the portion.

Determining the number of participants to the portion of the conversation thread can include determining the number of participants that submitted at least one message that is included in the portion. Identifying the conversation thread from a plurality of messages can include identifying a plurality of messages that correspond to the conversation thread and that are related by a reply relationship or a topical relationship. Generating a representation of a portion of the conversation thread based comparing the number of participants to the threshold value can include flattening a representation of the portion based on comparing the number of participants to the threshold value.

Comparing a number of participants associated with a portion of a conversation thread to a threshold value can include determining that the portion includes only messages by either of two participants. In response to the determination, a first representation can be generated such that the first representation presents each of the messages of the portion (e.g., the portion 215 of FIG. 2B) at a first indent level. A conversation view can be generated that includes a second representation of a second portion (e.g., a portion including messages 205a-205d of FIG. 2B) of the conversation thread located adjacent to the first representation. The second representation can present the second messages of the conversation thread at indent levels different from the first indent level.

In some implementations, a representation of a first portion of a conversation can be modified to align messages of the portion to a common vertical reference position. The representation is included in a conversation view that also includes a representation of a second portion of the conversation thread, and the messages of the second portion being offset from the vertical reference position.

Figure 2C:
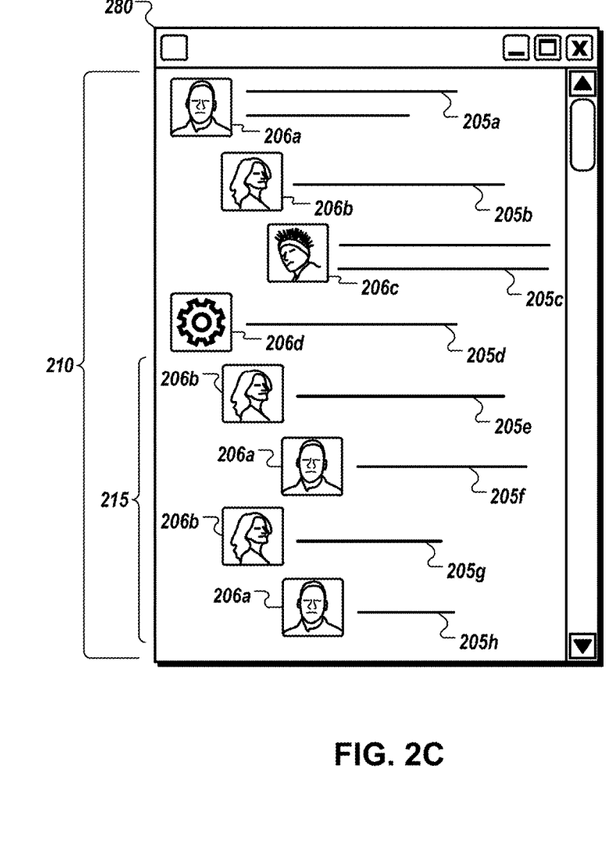

FIG. 2C is a diagram that illustrates an example of an enhanced conversation view 280. The conversation view 280 illustrates an alternative flattened representation for the portion 215. The messages are assigned indent levels such that messages submitted by one participant in the exchange have the same indent level, and messages submitted by another participant have a second indent level. Thus the indent levels in the flattened representation alternate between a first indent level and a second indent level, based on the participant that submitted the message.

Figure 2D:
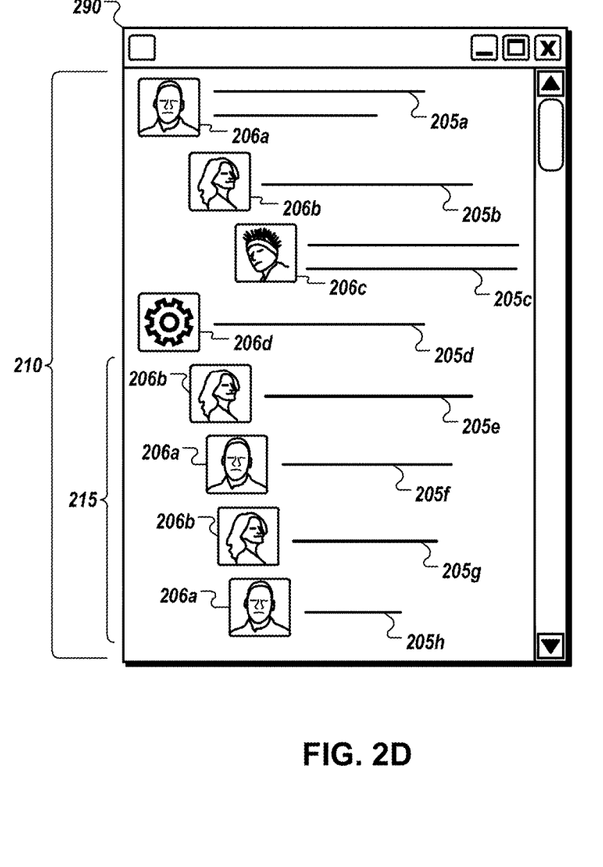

FIG. 2D is a diagram that illustrates an example of an enhanced conversation view 290. The conversation view 290 illustrates another alternative flattened representation for the portion 215. The conversation view 290 is generated such that messages in the portion 215 are progressively indented, according to their respective reply levels, similar to the conversation view 200 of FIG. 2A. However, for the portion 215, the difference in spacing corresponding to each indent level is less than for surrounding portions of the conversation thread 210. For example, each incremental increase in reply depth can result in a smaller increase in indentation than would otherwise occur in surrounding portions of the conversation thread 210. In the portion 215, each indent level above a base indent level can be displayed as a horizontal shift of five pixels. For other portions of the conversation thread 210, each indent level can be displayed as a horizontal space of ten pixels.

Figure 3:
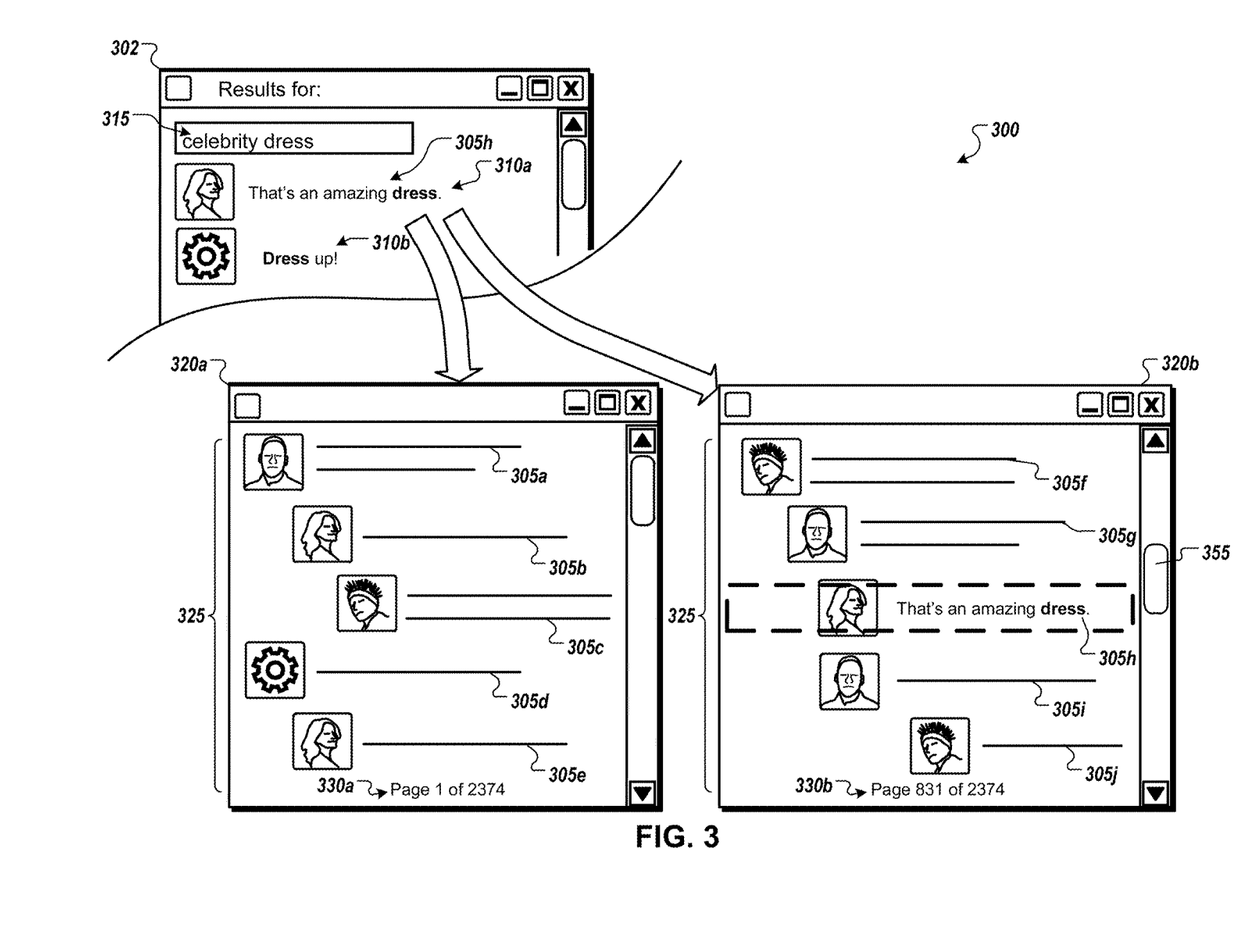

FIG. 3 is a diagram that illustrates examples of enhanced conversation views 320a, 320b. The diagram illustrates a user interface 302, which displays a search results page. The diagram also illustrates two conversation views 320a, 320b. One of the conversation views 320a, 320b may be displayed in response to selecting a search result in the search results page.

The user interface 302 displays a search query 315 submitted by a user, and search results 310a, 310b identified in response to the search query 315. The search query 315 can include one or more terms, and the search results 310a, 310b can be selected based on relevance to the terms of the search query 315. The search results 310a, 310b can correspond to a message in a conversation thread. A portion of, or all of, a message corresponding to a search result may be, but need not be, displayed, e.g., in a snippet of the search result. Different search results 310a, 310b may correspond to messages in the same conversation thread or to messages in different conversation threads.

In the illustrated example, the search results 310a, 310b each correspond to messages that include a term of the search query 315, "dress". The search result 310a corresponds to a message 305h, which is part of a conversation thread 325. The conversation thread 325 includes messages 305a-305j.

When a user interacts with one of the search results 310a, 310b, for example, by clicking a hyperlink or otherwise selecting a search result, a request for a resource that includes a conversation view (e.g., the request 135 of FIG. 1) can be sent to a server system. For example, when the user selects the search result 310a, a request can be sent for a conversation view for the conversation thread 325 that includes the message 305h. The server system can generate a conversation view for the conversation thread 325, and can send a resource that includes the conversation view to the user's computing system.

The server system may generate, and the user's computing system may display, the conversation view 320a in response to selection of the search result 310a. Because the conversation thread 325 includes many messages, the conversation view 320a includes only a portion of the conversation thread 325, for example, the portion that includes the messages 305a-305e.

The conversation view 320a includes a page indicator 330a that indicates that a representation of the full conversation thread 325 includes a set of multiple pages. The page indicator 330a also indicates that the conversation view 320a represents the first page of the set of pages. The first page may display, for example, a portion of the conversation thread 325 that includes the earliest messages 305a-305j, a portion of the conversation thread 325 that includes the most recent messages 305a-305j, or a portion of the conversation thread 325 that displays the most popular messages. By displaying the representation of the first page, the conversation view 320a may not include the message 305h that corresponds to the search result 310a that the user selected.

The conversation view 320b is another conversation view that may be generated and displayed in response to selection of the search result 310a. Rather than displaying the initial page of a representation of the conversation thread, the conversation view 320b displays a page that includes the message 305h that corresponds to the search result 310a. In the conversation view 320b, the message 305h is positioned in context with messages 305f, 305g, 305i, 305j to which it is logically related, for example, through reply relationships and or temporal sequence. For example, the message 305h may be displayed within a portion of the conversation thread 325 that displays or otherwise indicates a message to which the message 305h is a direct reply, or a message that is a direct reply to the message 305h. Thus the logical connection between the message 305h and other messages in the conversation thread 325 can be indicated.

The message 305h is also distinguished from the other messages 305f, 305g, 305i, 305j included in the conversation view 320b. For example, the message 305h can be distinguished by one or more of an indication, for example, a visual indication, e.g., highlighting, shading, borders, color, font, size, orientation, position, and other formatting.

In some implementations, data identifying a search result selected by the user is received by a computing system (e.g., by the server system 125). In response to receiving the data, a conversation view (e.g., the conversation view 320b) is generated that presents a message that corresponds to the user-selected search result. The message that corresponds to the user-selected search result can be distinguished from other messages that are presented in the conversation view.

The conversation view can be generated such that the message that corresponds to the user-selected search result is highlighted. Generating the conversation view can include identifying, in a plurality of pages that represent a conversation thread, a portion of a page that presents the message that corresponds to the user-selected search result. The conversation view can be generated to present the identified page.

In some implementations, the conversation view can be generated to cause a particular portion of the conversation to be displayed, for example, a position at which the message that corresponds to the user-selected search result is visible. For example, a conversation view may include a representation of a conversation thread that has a display size that exceeds the size of a user interface. When rendered, the conversation view can automatically display a pre-scrolled position, or cause scrolling to occur to reach a particular position, that presents the message that corresponds to the user-selected search result. For example, the conversation view 320b can include code or display parameters that cause a scrolling element 355 to be set to a predetermined value corresponding to a position at which the message 305h is visible. The scrolling element 355 may be a component of, for example, a web browser or of the conversation view 320b, and the scrolling element 355 need not be presented on the conversation view 320b.

Figure 4A:
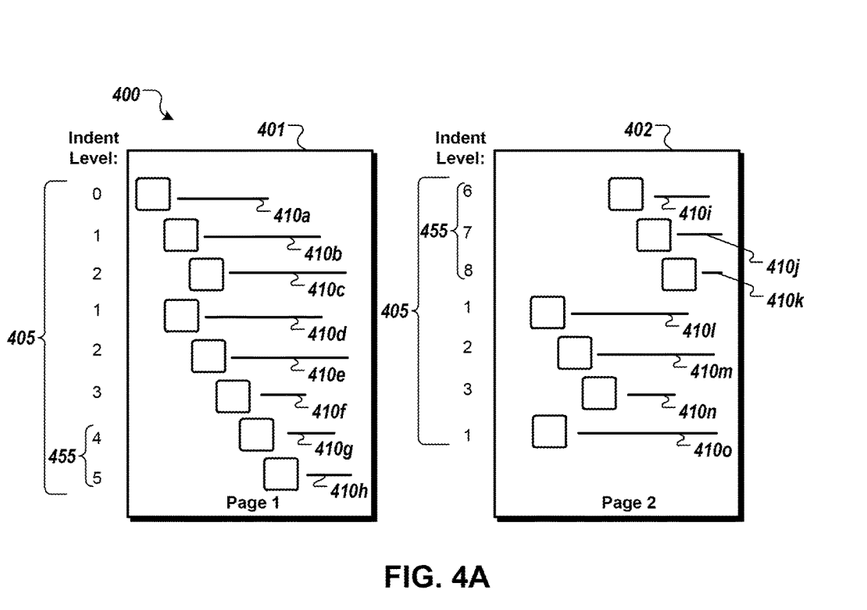

FIG. 4A is a diagram that illustrates an example of an enhanced conversation view 400. The conversation view 400 presents a conversation thread 405, which includes messages 410a-410o. The conversation view 400 includes two pages 401, 402, each presenting different portions of the conversation thread 405.

The messages 410a-410o are presented at indent levels that indicate the reply depth of each message 410a-410o. The reply depth can indicate, for example, the number of replies that are in the sequence that connects a message to, for example, a first message in a conversation thread. The greater the reply depth, the greater the indent level, and thus the farther to the right that the corresponding message is indented.

For example, the first message 410*a*, which is not a reply to any other message, has a reply depth of zero and is presented at an indent level of zero. The second message 410*b*, which is a reply to the first message 410*a*, has a reply depth and an indent level of one. The third message 410*c*, which is a reply to the second message 410*b*, has a reply depth and an indent level of two, and so on. The reply depth and the indent level can be different.

The conversation view 400 presents the messages 410*a*-410*o* in the conversation thread 405 at their respective indent levels. The indent levels of the messages 410*a*-410*o* range from zero to eight. The conversation view 400 is paginated to present a maximum number of messages 410*a*-410*o* on each page 401, 402, for example, eight messages 410*a*-410*o*. As a result, the portion of the conversation thread 405 displayed on the second page 402 begins with the message 410*i* displayed at an indent level of six.

Figure 4B:
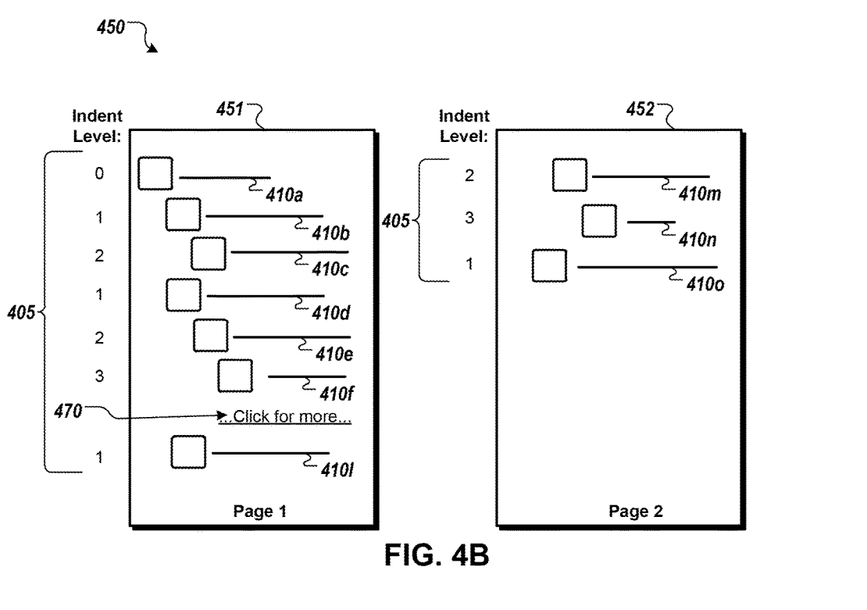

FIG. 4B is a screenshot diagram that illustrates an example of a conversation view 450. The conversation view 450 presents the conversation thread 405 and includes two pages 451, 452.

In some instances, abrupt transitions between messages with high indent levels to messages of low indent levels, or vice versa, can be confusing to a user. For example, a user may not accurately perceive the differences in reply depths corresponding to large changes in indent levels. To aid the user in understanding the nature of the conversation thread 405, messages with indent levels greater than a predetermined value can be omitted from display.

Unlike the conversation view 400, the conversation view 450 presents only messages that have a reply depth that satisfies an indent level threshold. Messages that have an indent level that does not satisfy the threshold are omitted. For example, the messages 410*g*-410*k* have respective indent levels that meet or exceed a predetermined maximum indent level of four, and are therefore omitted from the conversation view 450. The messages 410*a*-410*f*, 410*l*-410*o* have respective indent levels that are less than the maximum indent level, and therefore are presented in the conversation view 450. Alternatively, a reply depth threshold may be applied in addition to, or instead of an indent level threshold.

A portion 455 of the conversation thread 405 includes the omitted messages 410*g*-410*k*. In place of the portion 455, the conversation thread 405 presents an indicator 470, for example, an ellipsis or other symbol, that indicates that the portion 455 is omitted. The indicator 470 can be a hyperlink, a button, a plus symbol, or other user interface element that a user can interact with to cause the omitted portion 455 to be presented. In other words, the conversation view 450 compresses or collapses the portion 455, and the indicator 470 permits a user to expand the portion 455 so that the messages 410*g*-410*k* are visible.

To generate a conversation view, it can be determined that a portion of a conversation thread includes messages that have respective indent levels that meet or exceed a predetermined maximum indent level value. In response to the determination, a conversation view can be generated that includes one or more messages that precede or succeed the portion in the conversation thread, and that omits the messages that have respective indent levels that meet or exceed the predetermined maximum indent level value. In some implementations, a maximum reply depth value can be used rather than a maximum indent level value.

The conversation view can be generated to present a visual indicator in place of the portion of the conversation view. The visual indicator can be a user-selectable control for presenting the omitted messages that meet or exceed the predetermined maximum indent level value. For example, the user-selectable control can be a hyperlink or another user interface element that the user can select to cause the omitted messages to be displayed.

Figure 4C:
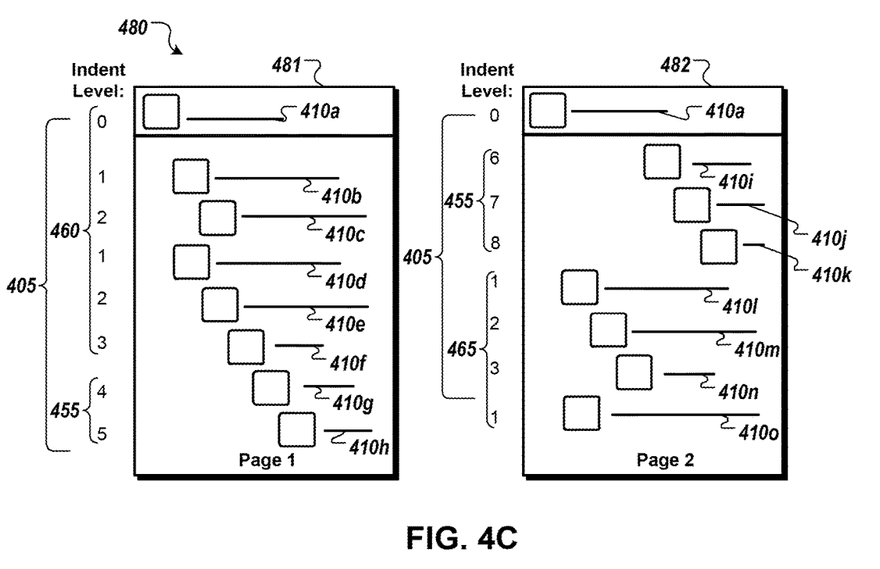

FIG. 4C is a diagram that illustrates an example of a conversation view 480. The conversation view 480 presents the conversation thread 405 and includes two pages 481, 452. The initial message 410*a* that begins the conversation thread 405 is displayed on each page 481, 482 of the conversation view 480. By presenting the message 410*a* on each page 481, 482, the conversation view 480 provides context for the other messages in the conversation thread 405 which may be, for example, replies to the message 410*a*, or replies to other replies.

In a similar manner, the initial message 410*a* can be presented in a fixed display area that does not move as a user scrolls through other portions of the conversation thread 405. Thus as the user scrolls through the messages presented in a conversation view, the message 410*a* can remain at a fixed position, for example, at the top of the conversation view.

Conversation views can be generated using combinations of the techniques described above. As an example, a conversation view can be generated that: (i) includes a flattened representation of an exchange between fewer than a predetermined number of participants; (ii) presents a message that corresponds to a user-selected search result, and distinguishes the message from surrounding messages; and (iii) omits messages having an indent level that meets or exceeds a predetermined indent level value. Other combinations and sub-combinations of the techniques described above can be used.

A number of implementations have been described. Nevertheless, it will be understood that various modifications may be made without departing from the spirit and scope of the disclosure. For example, various forms of the flows shown above may be used, with steps re-ordered, added, or removed.

Embodiments and all of the functional operations described in this specification can be implemented in digital electronic circuitry, or in computer software, firmware, or hardware, including the structures disclosed in this specification and their structural equivalents, or in combinations of one or more of them. Embodiments can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the techniques described herein or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where a hypertext markup language (HTML) file is mentioned, other file types or formats may be substituted. For instance, an HTML file may be replaced by an extensible markup language (XML), JavaScript object notation (JSON), plain text, or other types of files. Moreover, where a table or hash table is mentioned, other data structures (such as spreadsheets, relational databases, or structured files) may be used.

Particular embodiments have been described. Other embodiments are within the scope of the following claims. For example, the steps recited in the claims can be performed in a different order and still achieve desirable results. In addition, the logic flows depicted in the figures do not require the particular order shown, or sequential order, to achieve desirable results. In addition, other operations may be provided, or operations may be eliminated, from the described flows, and other components may be added to, or removed from, the described systems.

What is claimed is:

1. A method performed by data processing apparatus, the method comprising:
    receiving data identifying a search result selected by a user from among multiple search results on an Internet search engine results page, the user-selected search result corresponding to a particular message; and
    in response to receiving the data:
        identifying a conversation of messages that corresponds to the user-selected search result;
        determining that a maximum reply depth associated with a first portion of the conversation is less than an indent level threshold, the first portion of the conversation including the particular message;
        determining that a maximum reply depth associated with each message of a second portion of the conversation is greater than or equal to the indent level threshold; and
        generating a conversation view for the conversation, the conversation view displaying i) each message of the first portion of the conversation with an indent level corresponding to a reply depth of the message, and ii) an indicator indicating that the second portion of the conversation is omitted.

2. The method of claim 1, wherein generating the conversation view comprises:
    generating the conversation view such that the particular message is highlighted.

3. The method of claim 1, wherein generating the conversation view comprises:
    identifying, in a plurality of pages that represent a conversation thread, a page that presents the particular message; and
    generating the conversation view to present the identified page.

4. The method of claim 1, wherein generating the conversation view comprises generating the conversation view to scroll to a position at which the particular message is visible.

5. A system comprising:
    one or more computers and one or more storage devices storing instructions that are operable, when executed by the one or more computers, to cause the one or more computers to perform operations comprising:
        receiving data identifying a search result selected by a user from among multiple search results on an Internet search engine results page, the user-selected search result corresponding to a particular message; and
        in response to receiving the data:
            identifying a conversation of messages that corresponds to the user-selected search result;
            determining that a maximum reply depth associated with a first portion of the conversation is less than an indent level threshold, the first portion of the conversation including the particular message;
            determining that a maximum reply depth associated with each message of a second portion of the conversation is greater than or equal to the indent level threshold; and
            generating a conversation view for the conversation, the conversation view displaying i) each message of the first portion of the conversation with an indent level corresponding to a reply depth of the message, and ii) an indicator indicating that the second portion of the conversation is omitted.

6. The system of claim 5, wherein generating the conversation view comprises:
    generating the conversation view such that the particular message that corresponds to the user-selected search result is highlighted.

7. The system of claim 5, wherein generating the conversation view comprises:
    identifying, in a plurality of pages that represent a conversation thread, a page that presents the particular message; and
    generating the conversation view to present the identified page.

8. The system of claim 5, wherein generating the conversation view comprises generating the conversation view to scroll to a position at which the particular message is visible.

9. A non-transitory computer storage medium encoded with a computer program, the program comprising instructions that when executed by one or more computers cause the one or more computers to perform operations comprising:
    receiving data identifying a search result selected by a user from among multiple search results on an Internet search engine results page, the user-selected search result corresponding to a particular message; and
    in response to receiving the data:
        identifying a conversation of messages that corresponds to the user-selected search result;
        determining that a maximum reply depth associated with a first portion of the conversation is less than an indent level threshold, the first portion of the conversation including the particular message;
        determining that a maximum reply depth associated with each message of a second portion of the conversation is greater than or equal to the indent level threshold; and
        generating a conversation view for the conversation, the conversation view displaying i) each message of the first portion of the conversation with an indent level corresponding to a reply depth of the message, and ii) an indicator indicating that the second portion of the conversation is omitted.

10. The non-transitory computer storage medium of claim 9, wherein generating the conversation view comprises:
    generating the conversation view such that the particular message is highlighted.

11. The non-transitory computer storage medium of claim 9, wherein generating the conversation view comprises:
    identifying, in a plurality of pages that represent a conversation thread, a page that presents the particular message; and
    generating the conversation view to present the identified page.

12. The non-transitory computer storage medium of claim 9, wherein generating the conversation comprises generating the conversation view to scroll to a position at which the particular message is visible.

* * * * *